United States Patent

Yablonsky et al.

[11] Patent Number: 5,853,573
[45] Date of Patent: Dec. 29, 1998

[54] GROUNDWATER TOTAL CYANIDE TREATMENT APPARATUS

[75] Inventors: Albert Yablonsky, Woodsfield; Eugene R. Bolo, St. Clairsville, both of Ohio; John D. Reggi, Wheeling, W. Va.

[73] Assignee: Ormet Corporation, Wheeling, W. Va.

[21] Appl. No.: 890,808

[22] Filed: Jul. 11, 1997

Related U.S. Application Data

[62] Division of Ser. No. 491,495, Jun. 16, 1995, Pat. No. 5,647,996.

[51] Int. Cl.$^6$ .................................................. C02F 1/58
[52] U.S. Cl. ..................... 210/96.1; 210/101; 210/104; 210/143; 210/195.1; 210/202; 210/205
[58] Field of Search ..................... 210/709, 743, 210/744, 86, 96.1, 101, 104, 143, 199, 202, 205, 195.1

[56] References Cited

U.S. PATENT DOCUMENTS

| | | | |
|---|---|---|---|
| 3,147,213 | 9/1964 | Byron et al. | 210/1 |
| 3,835,045 | 9/1974 | Hussissian | 210/709 |
| 3,846,293 | 11/1974 | Campbell | 210/725 |
| 3,847,807 | 11/1974 | Herman et al. | 210/46 |
| 4,176,060 | 11/1979 | Sury et al. | 210/62 |
| 4,312,760 | 1/1982 | Neville | 210/724 |
| 4,465,593 | 8/1984 | Wemhoff | 210/96.1 |
| 4,543,189 | 9/1985 | Rice et al. | 210/713 |
| 4,724,084 | 2/1988 | Pahmeier et al. | 210/709 |
| 5,015,396 | 5/1991 | D'Orazio et al. | 210/763 |
| 5,055,199 | 10/1991 | O'Neill et al. | 210/684 |
| 5,093,007 | 3/1992 | Domvile | 210/713 |
| 5,106,508 | 4/1992 | Schwitzgebel | 210/712 |
| 5,160,632 | 11/1992 | Kleefisch et al. | 210/734 |
| 5,160,637 | 11/1992 | Bell et al. | 210/766 |
| 5,178,773 | 1/1993 | Kerlin et al. | 210/724 |
| 5,290,455 | 3/1994 | Rakszawski | 210/763 |
| 5,433,853 | 7/1995 | Mamone | 210/615 |

FOREIGN PATENT DOCUMENTS 49-39264  12/1974  Japan .

OTHER PUBLICATIONS

R. Osantowski, Preliminary Project Report of "Physical/Chemical Treatment of Aluminum Plant Cathode Reprocessing Wastewater", EPA–600/, Oct. 1983, pp. i–iv and 1–37.

Primary Examiner—Peter A. Hruskoci
Attorney, Agent, or Firm—Webb Ziesenheim Bruening Logsdon Orkin & Hanson, P.C.

[57] ABSTRACT

A method and apparatus for the removal of total cyanide from aqueous solution. The method includes the steps of placing the aqueous solution into a reaction tank, adding lime, ferrous sulfate, and acid to the solution in the reaction tank and agitating the resultant mixture for a reaction time of about one hour. The agitated mixture is transferred from the reaction tank to a clarifier tank and polyelectrolyte solution is added to induce iron-cyanide complex precipitate coagulation. The apparatus includes a reaction tank to hold the aqueous solution and a lime slurry tank, ferrous sulfate tank and acid tank in flow communication with the reaction tank. A pH control assembly controls the flow of acid from the acid tank into the reaction tank and a reaction tank agitation assembly extends into the interior of the reaction tank. The clarifier feed conduit extends between the reaction tank and a clarifier tank. The apparatus further includes a means for transporting a solution from the reaction tank to the clarifier tank and a polyelectrolyte tank in flow communication with the clarifier feed conduit.

7 Claims, 1 Drawing Sheet

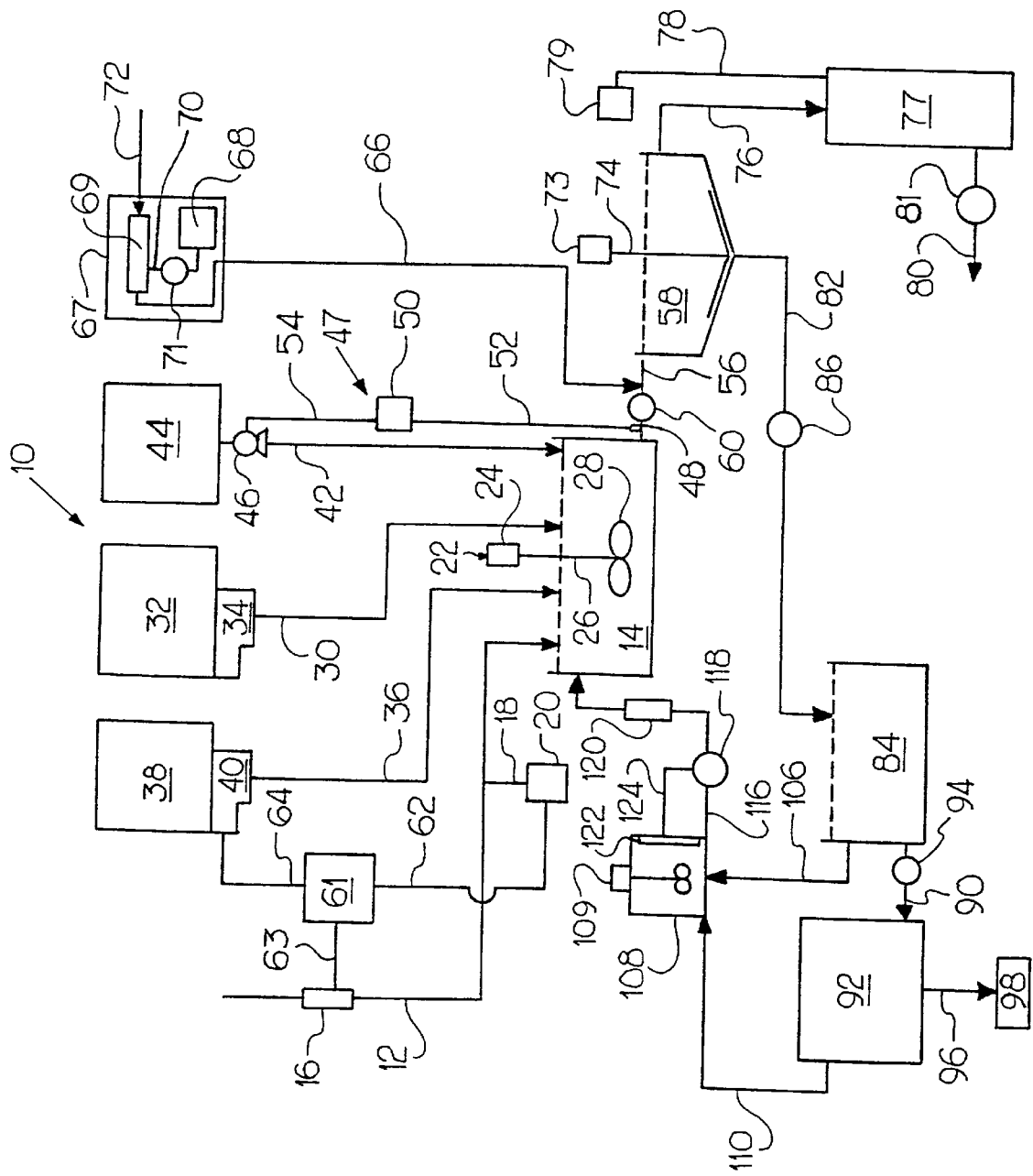

GROUNDWATER TOTAL CYANIDE TREATMENT APPARATUS

This application is a division of application No. 08/491,495, filed Jun. 16, 1995, now U.S. Pat. No. 5,647,996.

BACKGROUND OF THE INVENTION

1. Field of the Invention

This invention relates generally to the removal of total cyanide from aqueous solutions and, more particularly, to the removal of total cyanide from groundwater and industrial wastewater streams.

Primary aluminum metal is produced in electrolytic cells with carbon cathode or potlining. A by-product in the production of primary aluminum metal is water soluble complexed iron-cyanide. These complexed iron-cyanides similar to $Fe(CN)_6^{-4}$ are formed by the reaction of carbon in the potlining, nitrogen in the atmosphere and iron present as potlining electrical conductor bars and the pot shells. Unlike simple, "free" cyanides, the complexed cyanides do not dissociate readily and are therefore non-toxic. Also unlike simple, "free" cyanides, complex cyanides are very difficult to treat and remove.

Past practice common to the aluminum industry of storing spent potlining in an outdoor environment has resulted in the leaching of these complexed cyanides into the groundwater. This then becomes an environmental issue and must be dealt with according to state law and the Federal regulations of the Environmental Protection Agency (EPA).

2. Description of the Prior Art

Lime precipitation/coagulation is one of the oldest forms of chemical treatments used to treat wastewater. The lime precipitation/coagulation method dates back to the late 1800's. In this process, the calcium ion from the lime reacts with soluble anions to form insoluble compounds (e.g., calcium phosphate and calcium fluoride) which settle out of solution and can then be physically removed. Additionally, alkalinity imparted to the water as hydroxyl ions tends to coagulate certain organic compounds and colloidal materials. The net result is the removal of a wide range of materials from the treated water in the form of sludge.

This invention treats total cyanide by chemical precipitation/coagulation utilizing lime and ferrous iron salt.

Soluble $[Fe(CN)_6]^4$ ion reacts with ferrous iron to form a precipitate as follows:

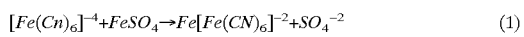

$$[Fe(Cn)_6]^{-4}+FeSO_4 \rightarrow Fe[Fe(CN)_6]^{-2}+SO_4^{-2} \qquad (1)$$

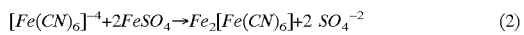

$$[Fe(CN)_6]^{-4}+2FeSO_4 \rightarrow Fe_2[Fe(CN)_6]+2\ SO_4^{-2} \qquad (2)$$

The formation of the $Fe_2[Fe(CN)_6]$ precipitate (Berlin White) is dependent upon the amount of available ferrous iron and the pH of the water.

The $[Fe(CN)_6]^{-4}$ ion can also react with ferric iron to form Prussian Blue precipitate as follows:

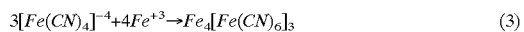

$$3[Fe(CN)_4]^{-4}+4Fe^{+3} \rightarrow Fe_4[Fe(CN)_6]_3 \qquad (3)$$

This reaction occurs under slightly acidic conditions.

Various processes have been developed specifically for the removal of both total and free cyanide from wastewater. The term "total cyanide" refers to all of the different forms of cyanide that exist in an aqueous solution. However, most of these processes utilize multiple reaction vessels and require adjusting the pH of the wastewater to very basic or acidic levels, i.e., high or low pH, during treatment. The initial capital cost of constructing a multiple reaction vessel facility increases with each reaction vessel required. Further, the pH levels generally required for treatment of the wastewater require special and expensive precautions to be taken to prevent corrosion damage to the reaction vessels and associated piping and also pose a safety hazard for workers who must operate and maintain the treatment facility.

One example of a known treatment process for the removal of cyanide from wastewater consists of two individual reaction stages, a lime treatment stage and a ferrous/ferric iron treatment stage. In this known process, lime is mixed with the wastewater in a first reaction vessel to increase the wastewater alkalinity. After settling, the supernatant from the first treatment vessel is introduced into a second treatment vessel in which the pH is adjusted with sulfuric acid to a range of between 3 to 5. The ferrous/ferric iron reagents are added to the second reaction vessel and the mixture is agitated. A polyelectrolyte solution is then added to the mixture and settling occurs in the second reaction vessel. The supernatant is withdrawn from the second reaction vessel and is filtered as a treated effluent before disposal. Available data reporting the cyanide concentration in treated groundwater using this known process shows a wide variability of treatment performance. Variations in cyanide concentrations of 1.1 to 13.0 mg/l in the treated effluent are common. This variability in cyanide removal levels is believed to be an inherent shortcoming in this prior two-stage process resulting specifically from the colloidal characteristics of the reaction mixture and the small quantity of iron-cyanide precipitate formed therein. In addition, the potential corrosion problems in operating a treatment facility at pH levels between 3 to 5 make this prior process relatively expensive and environmentally unfriendly, making it unattractive for use in a full-scale plant environment. U.S. Pat. No. 4,543,189 to Rice et al. discloses a method for removing complexed zinc-cyanide from steel mill wastewater such as is found in blast furnace blowdown water. Ferrous ions are added to the wastewater in a first reactor vessel along with acid to control the pH of the water. The wastewater is then transferred to a second reactor vessel in which the pH is further adjusted to cause cyanide to precipitate as Prussian Blue. Additional water treatment processes are disclosed in U.S. Pat. Nos. 3,147,213; 3,847,807; 4,176,060; 4,312,760; 5,015,396; 5,055,199; 5,093,007; 5,106,508; 5,160,637; and 5,290,455.

It is an object of the invention to provide a total cyanide treatment apparatus and method which solves the problems present in the prior art. The present invention provides an apparatus and a method for reducing cyanide to very low levels on a consistent basis while employing only a single reactor vessel. In addition, the process of the present invention operates at nearly a neutral pH which minimizes corrosion problems and eliminates the need for expensive construction materials.

SUMMARY OF THE INVENTION

The present invention is directed to a method and apparatus for the treatment and removal of total cyanide found in aluminum plant groundwater. In the method of the invention, a total cyanide containing groundwater stream is directed to a single stage reactor vessel. Lime is fed to maintain about 0.5 g/l (grams per liter) concentration of lime in the reactor vessel along with ferrous sulfate in the form of ferrous sulfate heptahydrate at an Fe/CN dose ratio determined by the total cyanide concentration in the wastewater stream and the iron concentration in the final effluent stream.

The pH of the reaction mixture is carefully controlled within the range of 6.5 to 7.0 by the addition of sulfuric acid to the reactor vessel. In the method, the ferrous sulfate reacts with complexed iron-cyanide to produce an iron-cyanide precipitate, while the lime addition causes coagulation and precipitation within the reactor vessel. The coagulated sludge produced by the lime effectively traps the iron-cyanide precipitate causing efficient settling of the precipitate within a clarifier vessel. It is important that the chemical reaction time in the reactor vessel not exceed about one hour. It has been found that reaction dwell times in the reactor vessel of longer than one hour actually cause an increase in the cyanide content of the effluent. Treated water from the reactor vessel is then mixed with a cationic polyelectrolyte material and the mixture is introduced into the clarifier vessel. The cationic polyelectrolyte induces further coagulation of the iron-cyanide complex precipitate within the clarifier. The polyelectrolyte solution is metered into the clarifier feedline at a rate necessary to produce rapid settling. In the clarifier, coagulated precipitate containing the iron-cyanide complex settles out of solution and collects in a conical bottom of the clarifier. Simultaneously, treated, purified water is withdrawn via an overflow effluent conduit of the clarifier as a treated effluent which may then be safely discharged to a surface water. Low concentration total cyanide levels in the treated effluent are achieved by the method of the present invention. The coagulated precipitate which settles out at the bottom of the clarifier forms an underflow sludge which is continuously pumped from the clarifier to a sludge thickener. Supernatant from the sludge thickener is pumped back to the reactor vessel through a recycling sump. Thickened sludge is then dewatered by a rotary drum vacuum filtration apparatus. Filtrate from this vacuum filter is recycled to the reactor vessel. Dewatered sludge filter cake may be collected from the vacuum filtration apparatus and safely disposed of in a landfill.

An apparatus for the removal of total cyanide from aqueous solution includes a reaction tank to hold the aqueous solution, a lime tank in flow communication with the reaction tank, a ferrous sulfate tank in flow communication with the reaction tank and an acid tank for holding an acid, with the acid tank in flow communication with the reaction tank. The apparatus further includes a pH control assembly for controlling the flow of acid from the acid tank into the reaction tank and a reaction tank agitation assembly having an agitator which extends into the interior of the reaction tank. The apparatus also includes a clarifier tank, a clarifier feed conduit extending between the reaction tank and the clarifier tank, means for transporting a mixture from the reaction tank to the clarifier tank and a polyelectrolyte tank in flow communication with the clarifier tank.

A complete understanding of the invention will be obtained from the following description when taken in conjunction with the accompanying drawing figure.

BRIEF DESCRIPTION OF THE DRAWING

The drawing is a schematic diagram of the preferred embodiment of the cyanide removal apparatus.

DESCRIPTION OF THE PREFERRED EMBODIMENTS

An apparatus for the removal of total cyanide from aqueous solution, such as complexed iron-cyanide contaminated groundwater, is generally designated 10 in the drawing. Apparatus 10 includes an influent conduit 12 connected to, and in flow communication with, a reaction tank 14. Influent conduit 12 includes an influent flow meter 16. A sampling line 18 extends between influent conduit 12 and an influent sampler 20.

A reaction tank agitation assembly 22 is located in proximity to reaction tank 14. Agitation assembly 22 includes a motor 24 attached by a shaft 26 to a rotary agitator 28 which extends into the interior of reaction tank 14.

A lime conduit 30 extends between a lime tank 32 and reaction tank 14. Lime conduit 30 includes a lime feeder/conveyor assembly 34 having a volumetric screw feeder. In an alternative embodiment, lime feeder/conveyor assembly 34 could be replaced by other transport devices, such as a slurry pump.

A ferrous sulfate conduit 36 extends between a ferrous sulfate tank 38 and reaction tank 14. Ferrous sulfate conduit 36 includes a ferrous sulfate feeder/conveyor assembly 40. Alternatively, ferrous sulfate feeder/conveyor assembly 40 could be replaced by any conventional material transport device, such as a slurry pump. An acid conduit 42 extends between an acid tank 44 and reaction tank 14. Acid conduit 42 includes an acid pump 46. A pH control assembly 47 is located near reaction tank 14. Control assembly 47 includes a pH sensor 48 which extends into the interior of a clarifier feed conduit 56 and is connected to a pH controller 50 by a cable 52. pH controller 50 is in electronic communication with acid pump 46 via a cable 54.

Clarifier feed conduit 56 extends between reaction tank 14 and a clarifier tank 58 having a sloping or conical bottom. Clarifier feed conduit 56 includes a clarifier feed pump 60. A proportional controller 61 is in electronic communication with influent sampler 20, influent flow meter 16 and ferrous sulfate feeder/conveyor assembly 40 by cables 62, 63 and 64, respectively.

A polyelectrolyte conduit 66 extends between a polyelectrolyte addition assembly 67 and clarifier feed conduit 56. Polyelectrolyte addition assembly 67 includes a polyelectrolyte tank 68 which is connected to a mixer 69 by a mixer conduit 70. Mixer conduit 70 includes a polyelectrolyte metering pump 71. A water conduit 72 is attached to mixer 69 and the discharge of mixer 69 is connected to polyelectrolyte conduit 66. Polyelectrolyte conduit 66 is preferably attached to clarifier feed conduit 56 at a point close to clarifier tank 58 to minimize mechanical shearing of the polyelectrolyte long chain molecules.

Clarifier tank 58 includes a motor 73 having a rake assembly 74 attached thereto. Rake assembly 74 extends into the interior of clarifier 58. A clarifier overflow effluent conduit 76 extends between clarifier tank 58 and a clarifier effluent tank 77. An effluent sampling line 78 extends between clarifier effluent tank 77 and an effluent sampler 79. An effluent tank discharge conduit 80 is connected to clarifier effluent tank 77 and has an effluent discharge pump 81 located therein.

A clarifier underflow conduit 82 is connected near the bottom of clarifier tank 58 and extends between clarifier tank 58 and a thickening tank 84. Clarifier underflow conduit 82 includes a clarifier underflow pump 86.

A thickening tank underflow conduit 90 is attached near the bottom of thickening tank 84 and extends between thickening tank 84 and a drum filter assembly 92. Thickening tank underflow conduit 90 includes a thickening tank underflow pump 94.

A sludge conduit 96 extends between filter assembly 92 and a portable sludge collection bin 98. The portable sludge collection bin 98 is transferred for proper disposal when full.

A thickening tank discharge conduit 106 is connected near the top of thickening tank 84 and extends between thickening tank 84 and a recycling sump 108. A filtrate conduit 110 extends between drum filter assembly 92 and recycling sump 108. A recycling sump agitation assembly 109 extends into the interior of recycling sump 108.

A recycling sump discharge conduit 116 extends between recycling sump 108 and reaction tank 14. Discharge conduit 116 includes a recycling sump pump 118 and a recycling flow meter 120. A level control assembly 122 is located in recycling sump 108 and is in electronic communication with recycling pump 118 by a cable 124.

Operation of apparatus 10 will now be described. Total cyanide contaminated groundwater is pumped through influent conduit 12 and influent flow meter 16 into reaction tank 14. The flow rate of ground water is transmitted from influent flow meter 16 to proportional controller 61 through cable 63. Samples of the contaminated groundwater are extracted from influent conduit 12 through sampling line 18 into influent sampler 20 to determine the total cyanide concentration in the groundwater. The total cyanide concentration is transmitted from influent sampler 20 to proportional controller 61 through cable 62.

Lime contained in lime tank 32 is transported by lime feeder/conveyor assembly 34 through lime conduit 30 into reaction tank 14. The flow rate of lime into reaction tank 14 is set to produce a lime concentration of about 0.5 g/l in reaction tank 14. In an alternative embodiment, a 3 weight % lime slurry solution may be used instead of solid lime and lime feeder/conveyor assembly 34 may be replaced with, for example, a lime slurry pump.

Ferrous sulfate heptahydrate is transported through ferrous sulfate conduit 36 by ferrous sulfate feeder/conveyor assembly 40 into reaction tank 14. Proportional controller 61 combines the flow rate data from influent flow meter 16 and total cyanide concentration data from influent sampler 20 and meters the flow rate of ferrous sulfate heptahydrate through feeder/conveyor assembly 40 into reaction tank 14 to maintain a predetermined ratio of Fe/CN determined by the total cyanide concentration in the wastewater stream and the iron concentration in the final effluent stream. In an alternative embodiment, a 10 weight % solution of ferrous sulfate heptahydrate may be used and ferrous sulfate feeder/conveyor assembly 40 may be replaced with, for example, a ferrous sulfate slurry pump.

Concentrated sulfuric acid solution is contained in acid tank 44. pH sensor 48 extends into the interior of clarifier conduit 56 to contact the liquid therein. pH sensor 48 is in electronic communication with pH controller 50 which, in turn, controls the operation of acid pump 46 in acid conduit 42. pH controller 50 controls acid pump 46 to add sulfuric acid to the mixture in reaction tank 14 to maintain the pH of the mixture in the reaction tank within a preferred range of 6.5 to 7.0. The mixture in reaction tank 14 is agitated by agitation assembly 22 for approximately a one-hour chemical retention time. During this retention time, the reactions set forth above in equations (1)-(3) take place. The ferrous sulfate begins to react with the total cyanide to produce an iron-cyanide precipitate while the lime addition causes coagulation and precipitation to begin, thus producing an agitated suspension or slurry in reaction tank 14.

It is important that the reaction time in reaction tank 14 be no more than about one hour. We have discovered that dwell times in excess of one hour in reaction tank 14 cause total cyanide in the precipitate to redissolve back into the solution. It is presently theorized that this phenomenon is due to the absorption of oxygen from the atmosphere into the agitated slurry in reaction tank 14. This atmospheric oxygen oxidizes ferrous iron into ferric iron according to the following reaction:

$$4Fe^{+2}+O_2+10H_2O \rightarrow 4Fe(OH)_3(s)+8H^+ \quad (4)$$

The rate of iron oxidation is faster at higher pH values. The newly forming ferric iron precipitates as ferric hydroxide, removing hydroxide ions from solution and leaving hydrogen ions behind. This relative increase in hydrogen ions, compared to hydroxide in the liquid, causes the pH to decrease. To compensate for ferrous iron that is removed from solution by oxidation to ferric iron and its subsequent precipitation, the ferrous ferrocyanide precipitate begins to redissolve as a means of maintaining overall chemical equilibrium. This causes the total cyanide concentration in the liquid phase to rise, as shown in the following equation:

$$Fe_2Fe(CN)_6(s) \rightarrow 2Fe^{+2}+Fe(CN)_6^{-4} \quad (5)$$

The primary pH increasing process is the release of carbon dioxide until the concentration remaining in solution equilibrates with the carbon dioxide concentration in the atmosphere. In the neutral and mildly alkaline pH region, the bicarbonate ion is in equilibrium with carbonic acid. Carbonic acid is a weak, unstable compound, which equilibrates with carbon dioxide and water. The two reactions involved are:

$$HCO_3^- + H^+ \leftrightarrows H_2CO_3 \quad (6)$$

$$H_2CO_3 \leftrightarrows CO_2 + H_2O \quad (7)$$

The release of carbon dioxide causes the pH to rise. This can easily be seen by combining the two preceding equations (7) and (8) as follows:

$$HCO_3^- + H^+ \rightarrow CO_2(g) + H_2O \quad (8)$$

The loss of carbon dioxide from the solution corresponds precisely with the elimination of an equivalent amount of hydrogen ion, which causes the pH to rise. Therefore, at too high pH, ferrous iron oxidizes rapidly enough for precipitated ferrocyanide to redissolve, thus raising the total cyanide concentration above that level which would result from operation at a somewhat lower pH. Thus, the reaction time in reaction tank 14 should be no more than one hour to reduce the contact time between atmospheric oxygen and the ferrous ferrocyanide precipitate. Further, the precipitates should be settled as quickly as possible and removed from the liquid phase.

The agitated slurry solution in reaction tank 14 is pumped through clarifier feed conduit 56 by clarifier feed pump 60 into clarifier tank 58. Cationic polyelectrolyte (for example, Calgon POL-E-Z 624) is pumped from polyelectrolyte tank 68 by polyelectrolyte metering pump 71 into mixer 69 where the polyelectrolyte is mixed with water supplied by water conduit 72. This polyelectrolyte solution then flows through polyelectrolyte conduit 66 into the slurry solution flowing through clarifier feed conduit 56. The polyelectrolyte solution is metered into clarifier feed conduit 56 to produce a polyelectrolyte concentration of, for example, between 1.0 and 1.5 mg/l to induce rapid iron-cyanide complex precipitate coagulation. In the clarifier, coagulated sludge produced by the lime effectively traps the iron-cyanide precipitate causing efficient settling of the cyanide precipitates and lime precipitates within clarifier tank 58. The precipitates settle out of solution and form a sludge on the conical bottom of clarifier tank 58 which can be raked by rake assembly 74.

The supernatant in clarifier tank 58 is removed through overflow effluent conduit 76 to clarifier effluent tank 77. Samples of the effluent may be removed from clarifier effluent tank 77 through effluent sampling line 78 and into effluent sampler 79 to test the concentration of components of interest in the effluent. The effluent from clarifier effluent tank 77 can be safely pumped out through effluent tank discharge conduit 80 by discharge pump 81 to a surface water.

The sludge formed in clarifier tank 58 is pumped through clarifier underflow conduit 82 by clarifier underflow pump 86 into thickening tank 84 where further separation of the aqueous solution from the solid sludge occurs. The thickened sludge located on the bottom of thickening tank 84 is intermittently pumped through underflow conduit 90 by thickening tank underflow pump 94 into drum filter assembly 92. The thickened sludge is dewatered by a rotary drum vacuum filtration system in drum filter assembly 92. Dewatered sludge filter cake is removed through sludge conduit 96 into portable sludge collection bin 98 for storage. The sludge in sludge collection bin 98 is then properly disposed of, for example, by placement in a landfill. The filtrate from drum filter assembly 92 is transported through filtrate conduit 110 into recycling sump 108. The supernatant from thickening tank 84 is transported through thickening tank discharge conduit 106 to recycling sump 108. The combination of thickening tank supernatant and filtrate from filter assembly 92 in recycling sump 108 is mixed by agitation assembly 109. When the level of liquid in recycling sump 108 reaches a predetermined level, level control assembly 122 activates recycling pump 118 to pump the liquid through discharge conduit 116 and recycling flow meter 120 back into reaction tank 14 for further treatment.

EXAMPLE

An industrial wastewater stream having a total cyanide concentration of 2 to 5 mg/l was treated using the above apparatus and method. Operating parameters were as follows:

| lime concentration | 0.5 g/l |
|---|---|
| Fe/CN | about 25:1 weight ratio |
| pH in reaction vessel | 6.5 to 7.0 |
| Calgon POL-E-Z 624 | 1.0 to 1.5 mg/l |

A better than 70% reduction in total cyanide concentration in the contaminated groundwater was achieved.

While embodiments of the invention have been described in detail herein, it will be appreciated by those skilled in the art that various modifications and alternatives to the embodiments could be developed in light of the overall teachings of the disclosure Accordingly, the particular arrangements are illustrative only and are not limiting as to the scope of the invention which is to be given the full breadth of the appended claims and any and all equivalents thereof.

We claim:

1. An apparatus for the removal of total cyanide from aqueous solution, said apparatus comprising:

a reaction tank to hold the aqueous solution;

a lime tank in flow communication with said reaction tank;

a ferrous sulfate tank in flow communication with said reaction tank;

an acid tank for holding an acid, wherein said acid tank is in flow communication with said reaction tank;

a pH control assembly for controlling the flow of acid from said acid tank into said reaction tank; an influent flow meter; an influent sampler for determining total cyanide concentration in said aqueous solution; a ferrous sulfate feeder/conveyor assembly; a proportional controller, wherein said influent flow meter and said influent sampler are in electronic communication with said proportional controller and wherein said proportional controller is in electronic communication with said ferrous sulfate feeder/conveyor assembly to maintain a predetermined ratio of Fe/CN in said reaction tank;

a reaction tank agitation assembly having an agitator, wherein said agitator extends into an interior of said reaction tank;

a clarifier tank;

a clarifier feed conduit extending between said reaction tank and said clarifier tank;

means for transporting a mixture from said reaction tank to said clarifier tank; and a polyelectrolyte tank in flow communication with said clarifier feed conduit.

2. The apparatus as set forth in claim 1, further including an effluent conduit connected near a top of said clarifier tank;

a thickening tank;

a clarifier underflow conduit connected near a bottom of said clarifier tank and extending between said clarifier tank and said thickening tank; and means for transporting sludge from said clarifier tank to said thickening tank through said clarifier underflow conduit.

3. The apparatus as set forth in claim 2, further including a thickening tank discharge conduit connected near the top of said thickening tank;

a thickening tank underflow conduit attached near the bottom of said thickening tank;

a filter assembly;

means for transporting thickened sludge from said thickening tank to said filter assembly through said thickening tank underflow conduit;

a filtrate conduit; and a recycling sump, wherein said thickening tank underflow conduit extends between said thickening tank and said filter assembly, wherein said thickening tank discharge conduit extends between said thickening tank and said recycling sump, and wherein said filtrate conduit extends between said filter assembly and said recycling sump, and wherein said recycling sump includes a recycling sump agitation assembly which extends into an interior of said recycling sump.

4. The apparatus as set forth in claim 3, further including:

a recycling sump discharge conduit extending between and in flow communication with said recycling sump and said reaction tank; and means for transporting liquid from said recycling sump to said reaction tank through said recycling sump discharge conduit.

5. An apparatus as set forth in claim 3, wherein said recycling sump includes a level control assembly.

6. The apparatus as claimed in claim 1, wherein said pH control assembly is configured to maintain a pH of between about 6.5–7.0 for the aqueous solution in said reaction tank.

7. The apparatus as claimed in claim 1, wherein said agitation assembly is configured to agitate the aqueous solution in the reaction tank for a reaction time of no more than about one hour.

* * * * *

UNITED STATES PATENT AND TRADEMARK OFFICE
CERTIFICATE OF CORRECTION

PATENT NO. : 5,853,573
DATED : December 29, 1998
INVENTOR(S) : Albert Yablonsky et al.

It is certified that error appears in the above-identified patent and that said Letters Patent is hereby corrected as shown below:

Column 1 Line 45 "$[Fe(CN)_6]^4$" should read --$[Fe(CN)_6]^{-4}$--

Column 2 Line 62 after "single" delete --stage--.

Signed and Sealed this

Eighth Day of June, 1999

Attest:

Q. TODD DICKINSON

*Attesting Officer*   Acting Commissioner of Patents and Trademarks